United States Patent [19]

Pahr

[11] Patent Number: 5,229,620
[45] Date of Patent: Jul. 20, 1993

[54] SYSTEM FOR INTEGRATED TAPE HOLE DETECTION BY DETECTING AN EDGE OF THE TAPE AND/OR A PATTERN ON THE TAPE

[75] Inventor: Per O. Pahr, Lier, Norway
[73] Assignee: Tandberg Data A/S, Norway
[21] Appl. No.: 814,840
[22] Filed: Dec. 31, 1991
[51] Int. Cl.$^5$ .......................................... G01N 21/86
[52] U.S. Cl. .................................... 250/561; 250/570
[58] Field of Search ............ 250/570, 561, 562, 208.3, 250/208.5, 222.1, 548; 353/26 A; 355/41; 354/298; 235/460

[56] References Cited

U.S. PATENT DOCUMENTS

| | | | |
|---|---|---|---|
| 4,329,060 | 5/1982 | Wilder | 250/561 |
| 4,363,042 | 12/1982 | Kimura et al. | 360/71 |
| 4,476,503 | 10/1984 | Solhjell | 360/75 |
| 4,609,959 | 9/1986 | Rudi | 360/106 |
| 4,662,757 | 5/1987 | Duran, Jr. | 250/548 |
| 4,679,104 | 7/1987 | Dahlerud | 360/78 |
| 4,827,141 | 5/1989 | Zwrin | 250/561 |
| 4,886,976 | 12/1989 | Tolmie, Jr. | 250/561 |
| 4,920,435 | 4/1990 | Yamazaki | 360/77.15 |
| 5,107,127 | 4/1992 | Stevens | 250/548 |

FOREIGN PATENT DOCUMENTS

| | | |
|---|---|---|
| 0032660 | 7/1981 | European Pat. Off. . |
| 2848047 | 5/1979 | Fed. Rep. of Germany . |
| 3347632 | 11/1985 | Fed. Rep. of Germany . |

OTHER PUBLICATIONS

Mead, et al. "Analog VLSI and Neural Systems" Reading, Ma.: Addison-Wesley Publishing Company, 1989 pp. 257-277, 229-231, 207-209, 96-123.
DeWeerth, et al. "A Two-Dimensional Visual Tracking Array", In: Allen, et al. (eds) Advanced Research in VLSI; Proceedings of Fifth MIT Conference, Cambridge, Mass.: MIT Press, mar. 1988, pp. 259-275.
Lassaro, et al. "Winner-Take-All Networks of O(N) Compexity", in Touretzky, (ed): Advances in Neural Information Processing Systems, 1988, pp. 703-711.
Behr, et al., "Technique for Measuring Dynamically the Dimensional Stability of a Flexible Magnetic Storage Disk", IEEE Trans. on Magnetics, Nov. 1981, vol. 17, No. 6.
Mead et al., "Scanners for Visualizing Activity of Analog VLSI Circuitry", Computation and Neural Systems Program, May 23, 1991, pp. 139-174.
OPTEK Technology, Inc., DATA Book, 1989, 1990.
SHARP Corporation Japan, OPTOELECTRONICS DATA BOOK, 1988, pp. 24-39 and 52 and 53.
Hardeng, "Measurements on Track Stability on 9135 Tape", Tandberg Data A/S, Sep. 28, 1990, p. 1-6.

*Primary Examiner*—David C. Nelms
*Assistant Examiner*—K. Shami
*Attorney, Agent, or Firm*—Hill, Steadman & Simpson

[57] ABSTRACT

A method and apparatus performs detection of an edge and detection of holes or other data patterns on a tape or other magnetic or optical medium. An array of photodetectors in an integrated circuit chip senses the intensity of light illuminating the chip with the tape running between a light source and the photodetectors. The holes or the other data patterns are sensed on the tape based on a comparison between detected light intensities with a programmable reference level. In addition, areas which may normally be sensed as a hole are discarded if these areas fall within a specified tolerance.

16 Claims, 3 Drawing Sheets

SYSTEM FOR INTEGRATED TAPE HOLE DETECTION BY DETECTING AN EDGE OF THE TAPE AND/OR A PATTERN ON THE TAPE

BACKGROUND OF THE INVENTION

The invention relates to a system for detecting holes on a magnetic medium or an optical medium especially for serpentine recording formats or parallel track formats using stationary read and write heads.

In high speed magnetic tape reading and writing units ("tape streamers"), data is read from, or written in, a plurality of data tracks which run parallel to the edges of a magnetic tape. Holes, patterns of holes or patterns formed by selectively creating semi-transparent areas in the tape are used for auxiliary information coding. In a conventional system for detecting holes, such as an end-of-media sensor, light emitting diodes (LED's) or incandescent lamps are used as sources of light. Light beams are directed towards the tape or other medium contained within a cassette. Discrete phototransistors are used as light sensitive devices and as pre-amplifiers. These phototransistors are placed in nominal positions where the light beams from the emitters are expected to strike when the tape holes on the tape pass.

A problem associated with such a system is that a preamplifier gain adjustment procedure is required to set the signal level input to a fixed threshold amplifier or comparator. This is normally performed using a potentiometer. Design of a fixed preamplifier gain is difficult and costly to implement for volume production since differences in optical/electrical DC transfer ratios are very large. The difference in light output is generally always greater than 4:1 for the emitters, typically 6:1 when the max/min values are specified using standard parts. The emitted light will also vary with temperature, for example, a ratio of 1.3:1 is typical.

For phototransistors, the gain spread is typically specified at 2:1 for a fixed temperature and is often more for standard parts. Furthermore, the dark current of phototransistors varies strongly with temperature which may easily cause a drift in the 100 mV-range in the DC output for worst-case samples of detectors with large collector loads. The calculations are further complicated by the mechanical tolerances of the optical path in the system including the tolerances of the placement of the emitters and receivers. As a result of the need for mass production of low-cost discrete components having large noise margins in a reasonable dynamic range, the detector in a typical tape streamer is built for operation using a +12 volt supply.

Integrated sensor systems are available which are sensitive to stray light pick-up which often is very difficult to eliminate in certain systems. Such systems have threshold levels which are specified for DC light inputs, and therefore, small margins exist for noise pick-up. However, relatively large currents may be needed in some applications to drive the light emitters to obtain a good signal-to-noise ratio. The threshold level will typically vary with temperature, from ±10% to ±20%, depending on the operating temperature range.

To reduce stray light pick-up problems and to increase the efficiency, infrared emitters and visible light cut-off filters are normally used. Applications which require even more ambient noise suppression include synchronous demodulators on the integrated sensor chip. The sensors will also have a specification for the ambient illuminance.

In addition, an oscillator and a driver for the light emitting diode is included in the synchronous receiver which may be disadvantageous in applications where the transmitter and receiver are physically separated. In addition, a problem with synchronous detectors exists in that excessive time delays in phase shifts may occur for the light emitting diodes. Depending on the type of emitters used, the phase shift may vary over the range 10 to 20 kHz. To avoid this, a carrier regenerator must be built into the receiver to reliably demodulate the signal. For many applications, for example, magnetic tape hole detection, a frequency below 10 kHz used by the synchronous detectors will be too low, since the tape often runs at a speed of 120 IPS (inches/second).

SUMMARY OF THE INVENTION

The present invention provides a method and apparatus for detecting a pattern of holes or other patterns on a medium, such as a magnetic tape. A tape hole detector is integrated with a tape edge detector such that both the edge of the tape and a pattern on the tape may be used by the same system on an integrated circuit chip.

The present invention provides a matrix of photodetectors on the chip in a known arrangement such that when the chip and matrix are illuminated, the relationship of the pattern on the tape and the edge of the tape may be determined.

It is, therefore, an object of the present invention to provide an integrated circuit chip with a plurality of photodetectors mounted thereon for determining both the edge of the tape and any patterns, such as holes, in the tape. These patterns are often indicative of information about the tape itself, such as the end of the tape.

It is a further object of the invention to monitor areas near the patterns which could cause a faulty reading indicating a hole or other pattern is present.

Another object of the invention is to verify operation of the system especially after an edge is not detected.

Other features and advantages of the present invention will be apparent from the following description, claims and accompanying drawings which fully describe the invention and the principles thereof.

DESCRIPTION OF THE PREFERRED EMBODIMENTS

Figure 1:
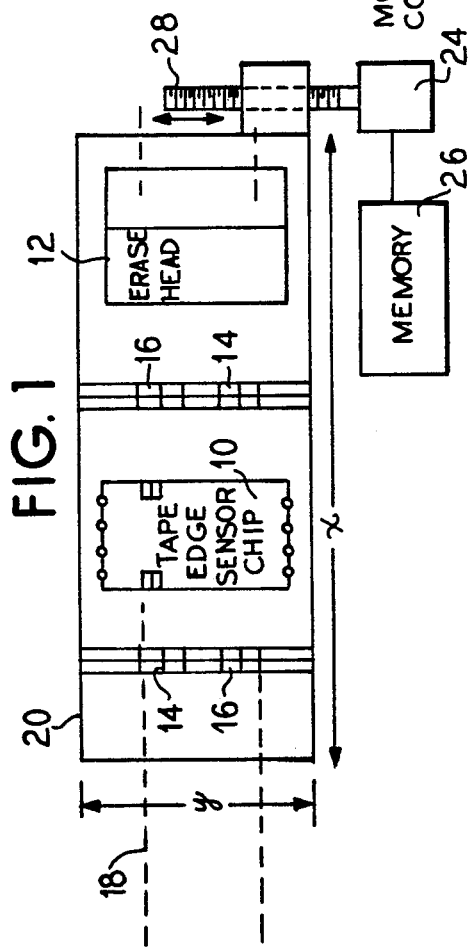
FIG. 1 is a front view of a standard two-channel recording head with the integrated chip mounted between the write/read gaps.

FIG. 1 shows an integrated CMOS chip 10 mounted on a typical magnetic recording head 20. The active surface of the chip 10 is facing a magnetic tape 18 and is mounted on a magnetic recording head 20 using tape automated bonding technology. The active surface of the chip 10 is protected by metal layers, and an array of windows is created during metallization. Details of this system are included in co-pending U.S. patent application, Ser. No. 07/815,165, the disclosure of which is fully incorporated herein by reference.

Behind the windows are integrated phototransistors which can be moved perpendicular to the transport direction of the magnetic tape 18. A light source illuminates the tape 18 and the surface of the chip 10 which is not covered by the tape 18. The tape 18 runs in close proximity to the surface of the chip 10 thereby creating a sharply defined boundary between the shadow area and the illuminated area on the active surface of the chip 10. The same photodetectors as used for the edge detector in co-pending U.S. patent application Ser. No. 07/815,165 are also used for the hole detector.

Figure 4:
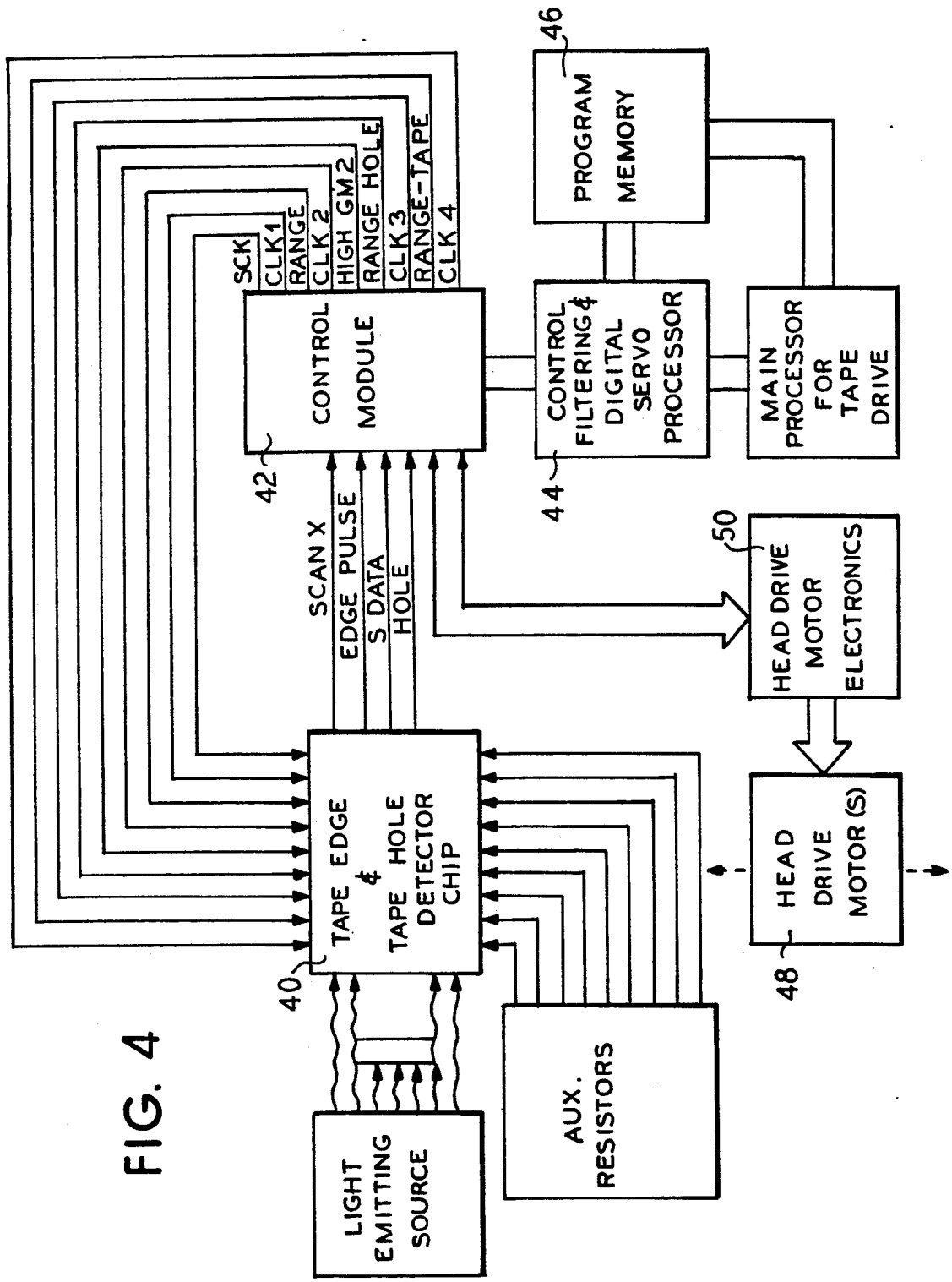
FIG. 4 is a diagram of the control environment for the combined tape edge and the tape hole detector chip.

The tape hole detector 40 in FIG. 4 has a programmable detection threshold level. The threshold level is set indirectly by an external controller module 42 as shown in FIG. 4. The hole detector 40 is, therefore, freely programmable both with respect to threshold level detection and for high spatial resolution used for the location of the holes.

When the static location(s) of the tape edge(s) is detected by the tape edge detector system 40, the position(s) where the defined tape holes or tape hole patterns will appear when the tape is moving is computed. Blocks of pixel rows are selected—for example, one block where the holes are anticipated and one where the holes are not expected to appear. Output currents from the individual pixels are summed, and the output from one block is then subtracted from the output of the other block. The extent to which integration is used depends on the parameters of the actual system, and the extent to which ground level noise is present. Some temporal averaging is always present in practical systems due to capacitance of electrodes to the substrate. As a result, the detector is less sensitive to light penetrating the magnetic tape.

Figure 3:
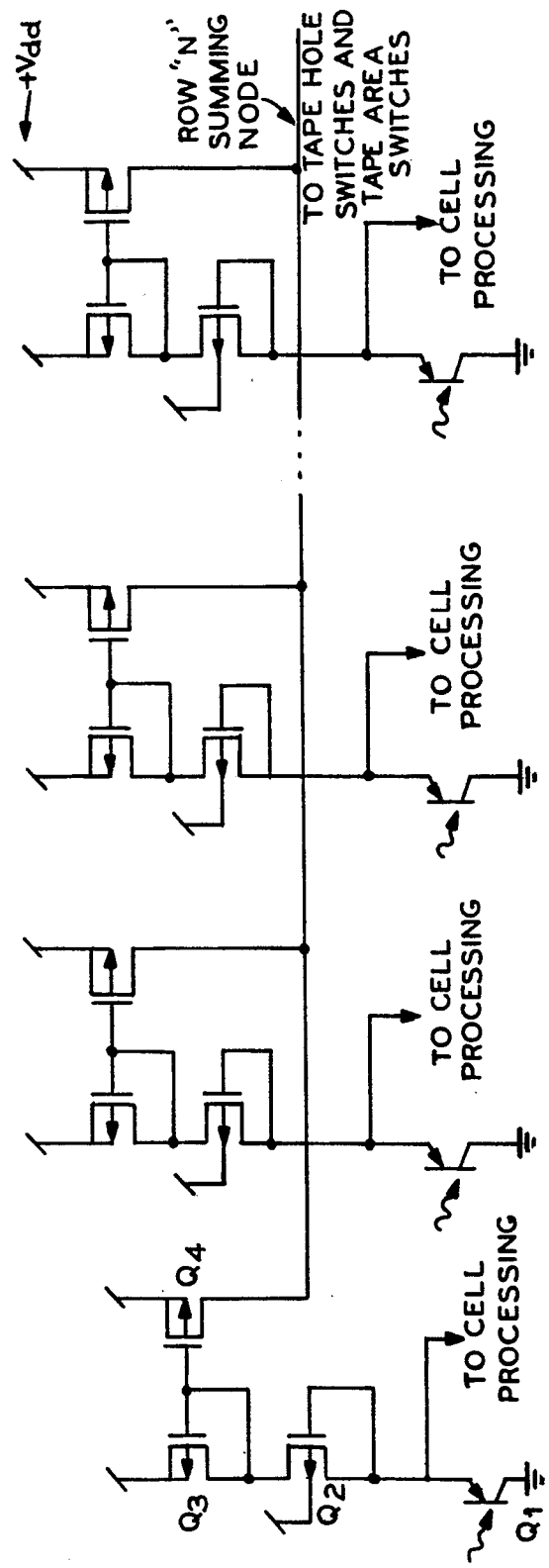
FIG. 3 is a diagram of the pixel current copying and summing circuitry.
Figure 2:
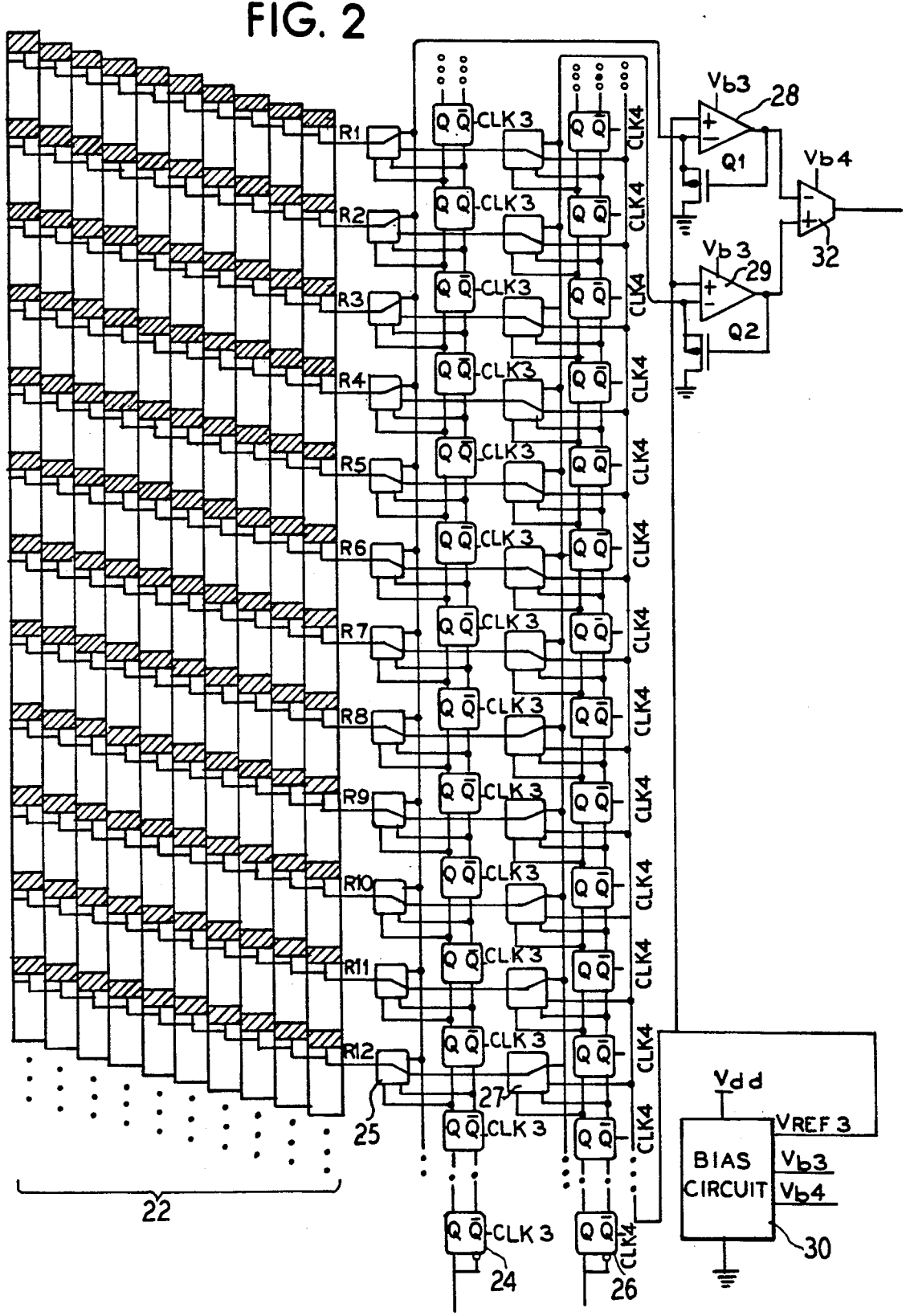
FIG. 2 is a diagram of the tape hole detection arrangement.

As shown in FIGS. 2 and 3, a complete description of a typical embodiment for implementing the invention is shown. FIG. 4 shows the additional signal and clock lines required.

The tape edge detector array 22 of processing cells is shown in FIG. 2. Shaded areas of the cells indicate photosensitive regions of each cell. One extra line per cell is required from each pixel cell to allow for a simple physical mask layout by summing currents from individual pixels on a row-by-row basis. FIG. 2 shows 12 row currents on lines R1 to R12.

FIG. 3 shows the implementation of the array and summation from FIG. 2. The row N summing node receives input currents from all pixels. Phototransistor Q1 of the leftmost cell delivers a current which passes through diode-connected transistors Q2 and Q3 which sets up a logarithmically compressed signal voltage which goes to the local processing cell of the edge detector. A copy of the photo current is then made by Q4. Therefore, the only difficulty faced by integrating the tape hole detection within the tape edge cells is the very small area required for each of the Q4 transistors. The Q1 and Q2/Q3 transistors implement the functions of the "PIXEL" and "LOG" blocks shown in the co-pending U.S. patent application, Ser. No. 07/812,165. The Q1 phototransistor may equally well be another type of sensor, such as, a PIN-diode. Which type to use will depend on the specific application, illumination levels and response speed requirements.

Selection of rows for signal and reference currents is performed by clocking in patterns of "zeros" and "ones" on the input lines "RANGE HOLE" and "RANGE TAPE" to two columns of shift registers 24, 26 using clocks "CLK3" and "CLK4", respectively, as indicated in FIG. 2. The content of the shift registers 24, 26 determines the state of the tape hole switches 25 and the tape area switches 27.

As an example, in FIG. 2, the currents on rows R1 to R4, in which the light through the tape holes is expected to appear, are switched to and summed on the signal current line which goes to the uppermost current sensing amplifier 28. The signal node is kept at a constant potential set up on the VREF3 output line from the bias circuit 30 due to feedback from the p-channel transistor Q1. When no light signal is present, a "dark" current mainly resulting from the translucency of the tap medium itself exists. This current comes from four rows where all pixels are covered by the tape medium. This is considered a no-signal current of "4 dark current units." The phototransistors and current mirrors which deliver the individual currents operate in the sub-threshold region, i.e. in the pA or lower nA range when no signal is present. Summing a large number of these currents gives a current in the sub-threshold range, and the gate of transistor Q1 is kept at about 500 mV below the VREF3 voltage.

As shown in FIG. 2, the currents on rows R5 to R7 are output to the VREF3 node. The switching routes are set up by "not" enabling the corresponding tape hole switches 25 and the tape area switches 27. The purpose of this is to discard those currents which are within a tolerance band for the tape hole positions in the area between the tape edge and the holes or in the areas in the chip outside the tape where the photodetectors always respond to the light. For simplicity, the last-mentioned rows are not shown in FIG. 2. Typically, much more than the three rows which are shown are necessary to account for all variations in tape hole positions.

The sum of the currents from the five rows R8 to R12 are used as a reference current fed to the lower current sense amplifier 29. The states of the corresponding switches 25, 27 are shown in FIG. 2. The selected number of reference rows must always be greater than the number of signal rows so that the voltage output from the lower current sense amplifier 29 (the voltage on the gate of Q2) is always less than the voltage at the output of the upper current sense amplifier 28 when tape holes are not present. This allows for an inherent "soft" and programmable threshold level for hole detection.

The light which comes through the tape holes causes a signal current input to the upper current sense amplifier 28. When this current is greater than the reference current, the voltage on the negative input of a comparator 32 will be lower than the voltage on the positive input, and the output of the comparator 32 goes "high", indicating the presence o f a hole. This signal is monitored by the signalling from the controller module 42 to a control, filtering and digital servo processor 44 shown in FIG. 4. During the loading of the shift registers 24, 26, the voltage on the "HOLE" line may toggle, but this is ignored by the control functions.

Detection is, therefore, based upon differential sensing of voltages in an inherently noise-immune method. Further, a large dynamic range due to the logarithmic compression performed by the p-channel feedback transistors of the current sense amplifiers 28, 29 ensures that voltage compliance at the input of the comparator 32 is satisfied. The row selection and current switching process takes place without any generation of voltage spikes or charging of stray capacitances. This ensures that a large array of switches may be quickly controlled and set up.

The tape hole detector 40 may also be used to check the computed position of the edge during the initial static edge location process in addition to comparing the computed tape width with the known tape width range stored in memory 46. This results in an edge resolution that will be coarse, but more than sufficient to allow for tape run-out detection.

Once a tape edge detector 40 finds an edge, the tape hole detector 40 looks for the edge by enabling a few rows outside the edge and a few but larger number of rows inside the tape edge. A very small guard-band or no guard-band at all between blocks of rows can be used during this process. Then, the two blocks of rows are shifted up or down so that all active rows are either below or above the tape edge. With a correctly programmed threshold level, no output on the "HOLE" signal line will exist for these two positions of the active blocks.

If the tape edge detector 40 does not find an edge, a full tape edge search is performed by the controller module 42. First, a self test of the tape hole detector 40 is performed by varying the number of signal rows and reference rows to see that the state of the "HOLE" signal line changes when selecting more signal rows than reference rows and vice-versa. The recording head is moved by the head drive motor 48 prior to this process to a mechanical end-stop position so that the active rows can be placed outside the location of the tape. Head drive motor electronics 50 receive signals from the controller module 42 to activate positioning of the head with the head drive motor 48. When the self test is completed, the correct threshold level for edge detection is set up again. Then, the two or three active blocks of rows are moved over the whole operating range of the detector 40. If no tape edge exists, "tape run-out" is reported, and the tape cartridge is ejected for inspection by a user. An error message may then be given to the user.

The "holes" in the tape include a single hole or a pattern of holes. Also, "holes" include physically punched holes in the tape and holes in the magnetic layer itself, i.e. if there is no hole or holes in the tape substrate.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for detecting at least one pattern or hole on a tape comprising the steps of:
   disposing said tape in front of a matrix of photodetectors in an integrated circuit chip, the position of each photodetector being known from the manufacture of said chip, wherein each photodetector generates an electrical signal corresponding to the intensity of light incident thereon;
   illuminating said tape and said matrix such that an edge of said tape corresponding to a sharpest light-to-dark transition region is located;
   analyzing said signals in a plurality of areas about which said at least one pattern or hole is expected and is not expected;
   comparing a sum of said signals from said areas to a reference level; and
   indicating presence of said at least one pattern or hole when said sum exceeds said reference level.

2. The method according to claim 1 further comprising the step of:
   discarding signals from a portion of said plurality of areas within a specified tolerance of actual areas in which said at least one pattern or hole is located.

3. The method according to claim 1 wherein said comparing step further comprises the step of:
   setting said reference level using a sum of signals from an area larger than each of said plurality of areas in which said at least one pattern or hole is expected and not expected.

4. The method according to claim 3 wherein said setting step is externally performed.

5. The method according to claim 1 further comprising the steps of:
   comparing a computed tape width derived from said analyzing of said signals from two edges with a known tape width; and
   determining if an edge is present from said comparison.

6. The method according to claim 1 further comprising the step of:
   performing a self-test operation to verify functioning of said at least one pattern or hole detection.

7. The method according to claim 1 further comprising the step of:
   reporting tape run-out when an edge is not detected.

8. The method according to claim 6 further comprising the step of:
   reporting tape run-out after said self-test operation has been performed indicating an edge cannot be detected.

9. A system for detecting at least one pattern or hole on a tape comprising:
   a matrix of photodetectors in an integrated circuit chip disposed behind said tape wherein the position of each photodetector is known from the manufacture of said chip and each photodetector generates an electrical signal corresponding to the intensity of light incident thereon;
   illumination means for projecting light on said tape and said matrix such that an edge of said tape corresponding to a sharpest light-to-dark transition region is located;
   analyzing means for processing said signals in a plurality of areas about which said at least one pattern or hole is expected and is not expected;
   means for comparing a sum of said signals from said areas to a reference level; and
   means for indicating presence of said at least one pattern or hole when said sum exceeds said reference level.

10. The system of claim 9 further comprising:
    means for discarding signals from a portion of said plurality of areas within a specified tolerance of actual areas in which said at least one pattern or hole is located.

11. The system of claim 9 further comprising:
    means for setting said reference level using a sum of signals from an area larger than each of said plurality of areas in which said at least one pattern or hole is expected and is not expected.

12. The system of claim 9 further comprising:
    means for comparing a computed tape width derived from said analyzing means with a known input tape width; and means for determining if an edge is present form said comparison.

13. The system of claim 9 further comprising:

means for performing a self test operation to verify functioning of said at least one pattern or hole detection.

14. The system of claim 9 further comprising: means for reporting tape run-out when an edge is not detected.

15. The system of claim 13 further comprising:

means for reporting tape run-out after said self-test operation has been performed indicating an edge cannot be detected.

16. The system of claim 9 further comprising:

external means for indirectly setting said reference level.

* * * * *